(12) United States Patent
Nygaard, Jr.

(10) Patent No.: US 6,191,683 B1
(45) Date of Patent: Feb. 20, 2001

(54) SYSTEM AND METHOD FOR COMPARING VALUES DURING LOGIC ANALYSIS

(75) Inventor: Richard A. Nygaard, Jr., Colorado Springs, CO (US)

(73) Assignee: Agilent Technologies, Inc., Palo Alto, CA (US)

( * ) Notice: Under 35 U.S.C. 154(b), the term of this patent shall be extended for 0 days.

(21) Appl. No.: 09/386,614

(22) Filed: Aug. 31, 1999

(51) Int. Cl.[7] .................................................. G05B 1/00
(52) U.S. Cl. ................................ 340/146.2; 326/40
(58) Field of Search ..................... 326/39, 40; 340/146.2

(56) References Cited

U.S. PATENT DOCUMENTS 4,100,532   7/1978   Farnbach ...................... 340/146.3 M

*Primary Examiner*—Margaret R. Wambach

(57) ABSTRACT

Disclosed is a system and method to compare logical values. The system employs a field programmable gate array (FPGA) configured for comparing logical values. The FPGA includes a number of inputs to receive an N-bit sampled value from a target system, where N defines the number of bits in the N-bit sampled value. The FPGA also includes a number of lookup tables configured to receive an M-bit portion of the N-bit sampled value. These lookup tables generate a lookup table output in response to the M-bit portion. Finally, an AND operation is performed on the outputs of the lookup tables that generates an output indicating whether the particular N-bit logical value matches a particular desired value. Note that a single AND gate may be used or a number of AND gates may be used in place of the single AND gate. The tables within the lookup tables are generated based upon a desired logical value and a comparison mask value.

11 Claims, 7 Drawing Sheets

SYSTEM AND METHOD FOR COMPARING VALUES DURING LOGIC ANALYSIS

TECHNICAL FIELD

The present invention is generally related to the fields of computers and digital analysis and, more particularly, is related to a system and method for comparing values from a target system during logic analysis.

BACKGROUND OF THE INVENTION

Current manufacturers of high-speed computer equipment often need to access data information that is communicated on a data bus or other conductors within the equipment for testing or other reasons. Conventional approaches to accessing data on a bus include the use of logic analyzers that provide probes that are placed in electrical contact with the particular conductors in question.

In a typical arrangement, the probes are positioned to obtain the data signals from the target system and the target system is operated to produce the desired data values that are captured by the probes. These data values are acquired and stored in a memory in the logic analyzer. However, many of the target systems that are analyzed using logic analyzers operate at speeds measured in hundreds of megahertz. Consequently, the data values obtained from such a target system will quickly fill up the memory of the logic analyzer. In many cases, this occurs within a few milliseconds.

As a result, logic analyzers have employed circuitry to perform a quick comparison between the values obtained from the target system and desired values specified by the user to detect specific data values from the target system. Generally, only those data values from the target system are stored in the memory of the logic analyzer. In this manner, a reduced number of data values are then stored in the memory of the logic analyzer, thus preventing the memory from becoming full prematurely.

The approaches employed to perform this comparison typically employ logic circuits and other devices of significant size and complexity. Accordingly, such circuits are costly and the number of desired values that may be employed by a single logic analyzer are limited.

SUMMARY OF THE INVENTION

In light of the foregoing, the present invention provides for a system and method to compare logical values from target systems. In one embodiment, the system employs a field programmable gate array (FPGA) configured for comparing logical values. In this embodiment, the FPGA includes a number of inputs to receive an N-bit logical value from a target system, where N defines the number of bits in the N-bit logical value. The FPGA also includes a number of lookup tables configured to receive an M-bit portion of the N-bit sampled value. These lookup tables generate a lookup table output in response to the M-bit portion. Finally, a logical AND operation is performed on the outputs of the lookup tables that generates an output indicating whether the particular N-bit logical value matches a particular desired value. Note that a single AND gate may be used or a number of AND gates may be used in place of the single AND gate. In this embodiment, the tables within the lookup tables are generated based upon a desired logical value and a comparison mask value.

The present invention may also be viewed as a method for compare logical values. In one embodiment, this method employs a field programmable gate array, comprising the steps of: receiving an N-bit logical value, where N defines the number of bits in the N-bit logical value, matching a number of M-bit portions of the N-bit sampled value with one of a number of M-bit portion variations, wherein a matching output is generated depending upon the M-bit portion variation that matches the M-bit portion, and, performing an AND operation on all of the matching outputs.

The various embodiments of the present invention provide a significant advantage in that a single FPGA may be employed to perform a greater number of comparisons than prior art configurations. Thus, a logic analyzer that employs the present invention has much greater capacity to detect specific logical values from a target system.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
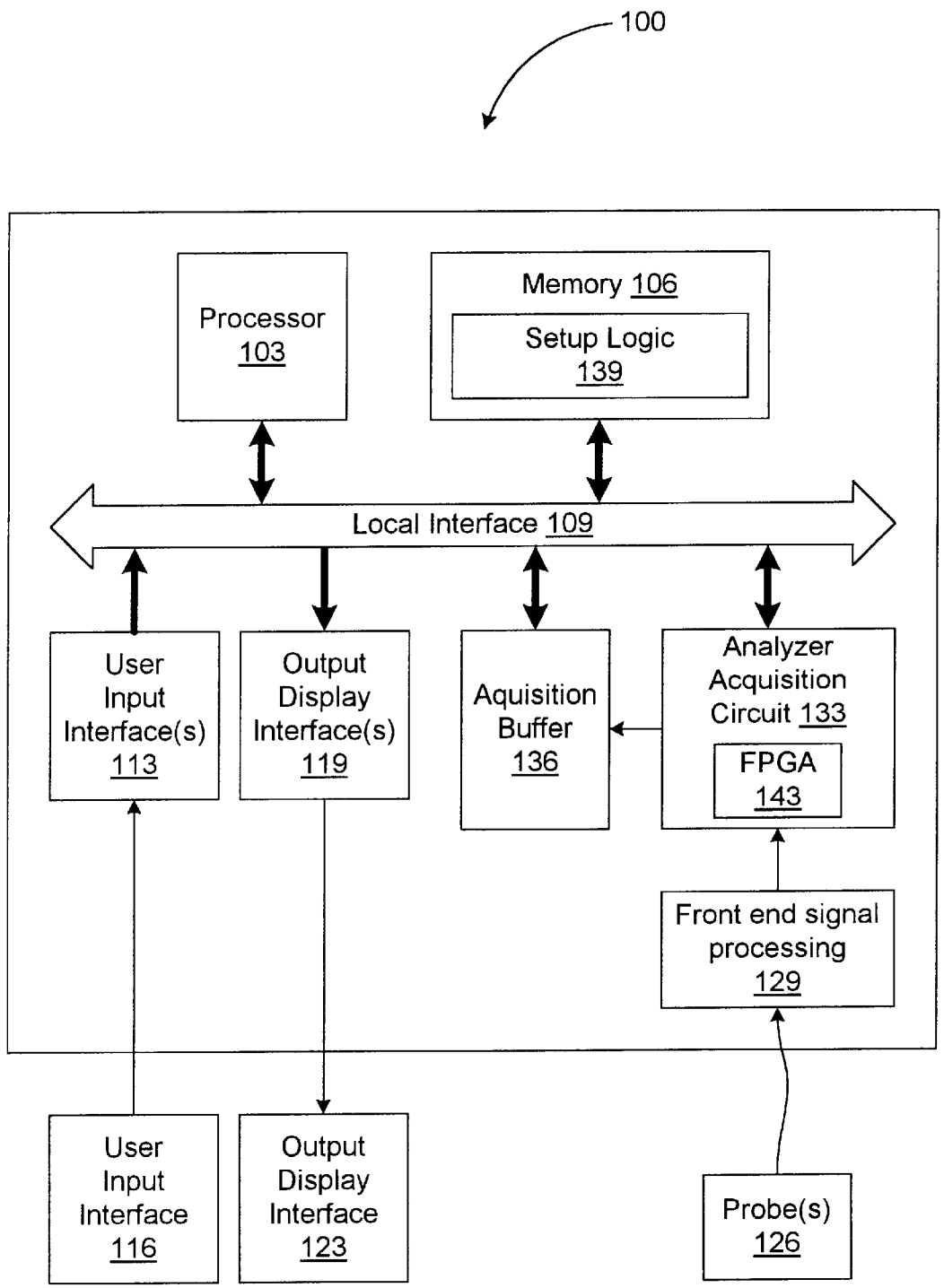
FIG. 1 is a block diagram of a logic analyzer according to an embodiment of the present invention.

Turning to FIG. 1, shown is logic analyzer 100 according to an embodiment of the present invention. The logic analyzer 100 includes a processor circuit that includes a processor 103 and a memory 106. The processor 103 and memory 106 are both coupled to a local interface 109. The local interface 109 may comprise, for example, a data bus and a control bus. The memory 106 includes volatile and/or nonvolatile memory components such as random access memory (RAM), read only memory (ROM), hard drive(s), compact disk drive(s) with accompanying compact disks, tape drives with accompanying magnetic tape, floppy disk drives with accompanying floppy disk(s), or other such devices. "Volatile" memory refers to that memory that is lost upon a loss of power, whereas "nonvolatile" refers to memory that maintains data values despite a loss of power.

The logic analyzer 100 further comprises an input interface 113 that makes data generated by a user interface 116 available on the local interface 109 to be manipulated by the processor 103, etc. The user interface 116 may include, for example, a keypad, keyboard, or other appropriate input device. The logic analyzer 100 also includes at least one output interface 119 through which data is applied from the local interface 109 to one or more output displays 123. The output displays may include, for example, a cathode ray tube, liquid crystal display, or other suitable display device.

In addition, the logic analyzer 100 features one or more probes 126 that are coupled to front end processing circuits 129 such as voltage comparators, level shifters, impedance matchers, equalizers, etc. During use of the logic analyzer 100, the probes 126 are coupled to a target system to obtain the logical signals therefrom. The logical signals are generally digital signals as known in the art. The logical signals are processed by the front-end signal processing circuits 129 to ascertain logical values therefrom. The front end processing circuits 129 are generally understood by those skilled in the art and are not discussed in detail herein. The logical values are then applied to the analyzer acquisition circuit 133. An acquisition buffer 136 is coupled to the analyzer acquisition circuit 133 that is used to store information from the target system as triggered by the analyzer circuit 133.

During operation of the logic analyzer 100, the analyzer acquisition circuit 133 performs a comparison function that detects the occurrence of desired logical values among the logical values obtained from the target system. The analyzer acquisition circuit 133 also acts as an acquisition buffer control that controls the storage of the information in the acquisition buffer and performs a trigger control function that indicates when storage into the acquisition buffer 136 should terminate.

Stored on the memory 106 is setup logic 139 of the present invention that is executed by the processor 103. The setup logic 139 is executed to configure the analyzer acquisition circuit 133 for detection of specific desired logical values and for performing other functions. To perform these tasks, the analyzer acquisition circuit 133 may include one or more field programmable gate arrays (FPGAs) 143, which are well known in the art. During startup of operation of the logic analyzer 100, one of the tasks performed by the setup logic 139 is to download a configuration string into the FPGA 143. This configuration string causes the FPGA 143 to operate in a predefined manner to compare incoming logical values with desired logical values as will be discussed in addition to the other functionality mentioned previously. For further discussion relative to a possible example of the logic analyzer 100, reference is made to U.S. patent application entitled "Reconfigurable Digital Instrument Mainframe," that was filed on Apr. 17, 1999 and accorded Ser. No. 09/300,207, and is incorporated herein by reference in its entirety.

Figure 2:
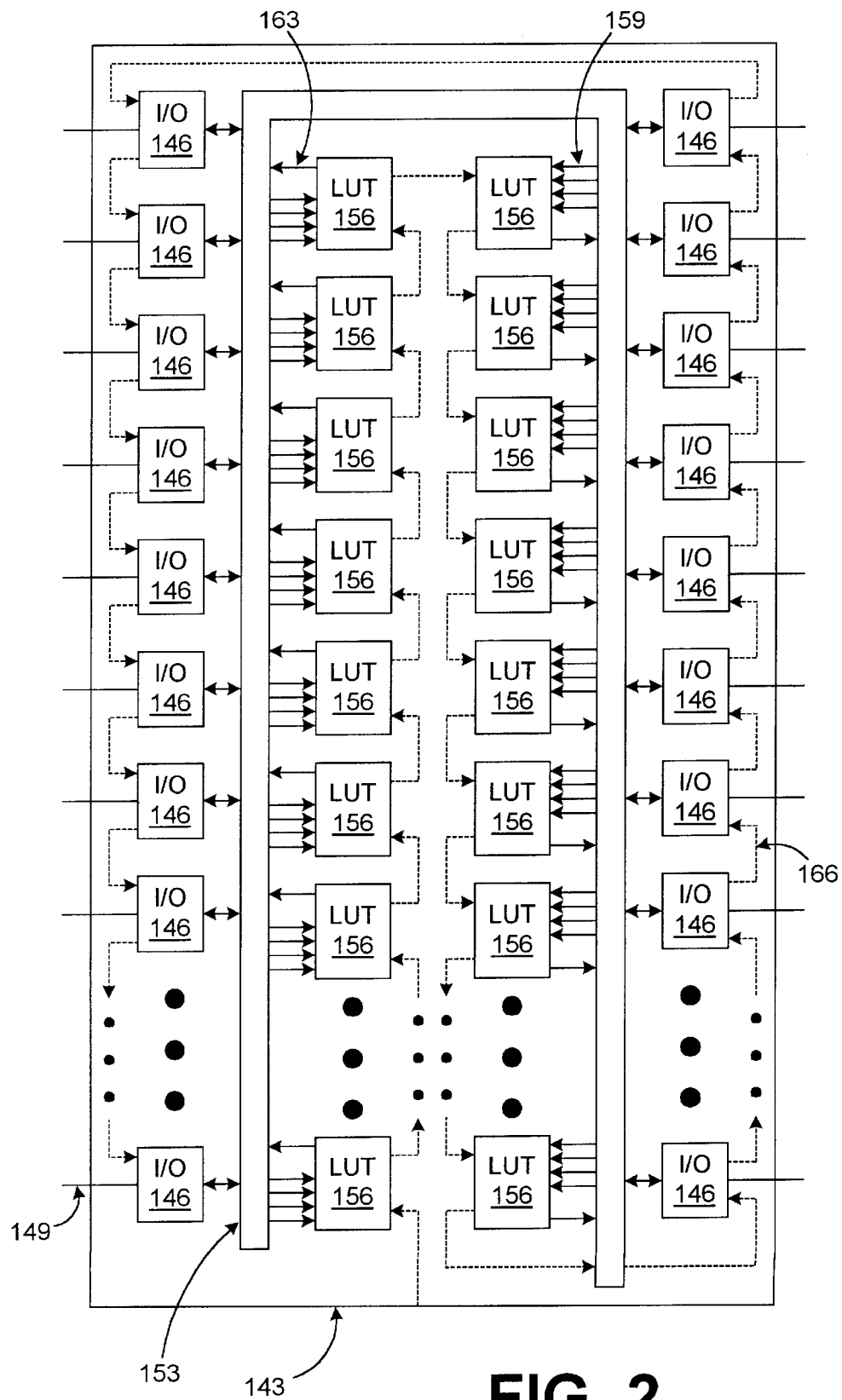
FIG. 2 is a block diagram of a representative field programmable gate array (FPGA) employed in the logic analyzer of FIG. 1.

With reference to FIG. 2, shown is a block diagram of a representative FPGA 143 as employed in the present invention. The FPGA 143 includes a number of input/output circuits 146 that are each electrically coupled to an input/output pin 149. The input/output circuits 146 are configurable to either receive or transmit data values and include, for example, a data buffer and other circuitry as known by those skilled in the art. For example, the input/output circuits 146 may perform various sampling functions and other functionality.

Each of the input/output circuits 146 is electrically coupled to a switching fabric 153. Also coupled to the switching fabric are a number of lookup tables 156. The switching fabric 153 serves to electrically couple the input/output circuits 146 to the lookup tables 156 so the values received by the input/output circuits 146 (for those configured to receive data) are applied to an appropriate lookup table 156 and so that outputs from the lookup tables 156 are applied to those input/output circuits 146 configured to transmit data values. Note that the switching fabric 153 may also link lookup tables to each other in order to perform various tasks.

Each of the lookup tables 156 includes four inputs 159 as shown with a single output 163. Each of the lookup tables 156, input/output circuits 146, and the switching fabric 153 are all linked in a manner so as to form a common configuration shift register 166 as shown. In fact, these components all receive shifted values as well as a shift clock signal that triggers the configuration function. To explain further, the various components in the FPGA 143 may be configured to perform one of a multitude of operations. A particular lookup table 156 or input/output circuit 146, for example, will perform these functions based upon the configuration values applied to the component at start up. These configuration values are applied to all of the components in the form of a single configuration string of bits that are shifted into all of the components as shown. When the first bit in the configuration string reaches the last position in the last component, shown as the input/output circuit 146 in the lower right corner, then each component will have its proper configuration values that control its operation. Thereafter, the FPGA 143 may be employed to perform the specific tasks in the logic analyzer 100 (FIG. 1). Thus, at start up, the configuration string is downloaded or shifted into the FPGA 100 before the acquisition of logical values begins.

Figure 3:
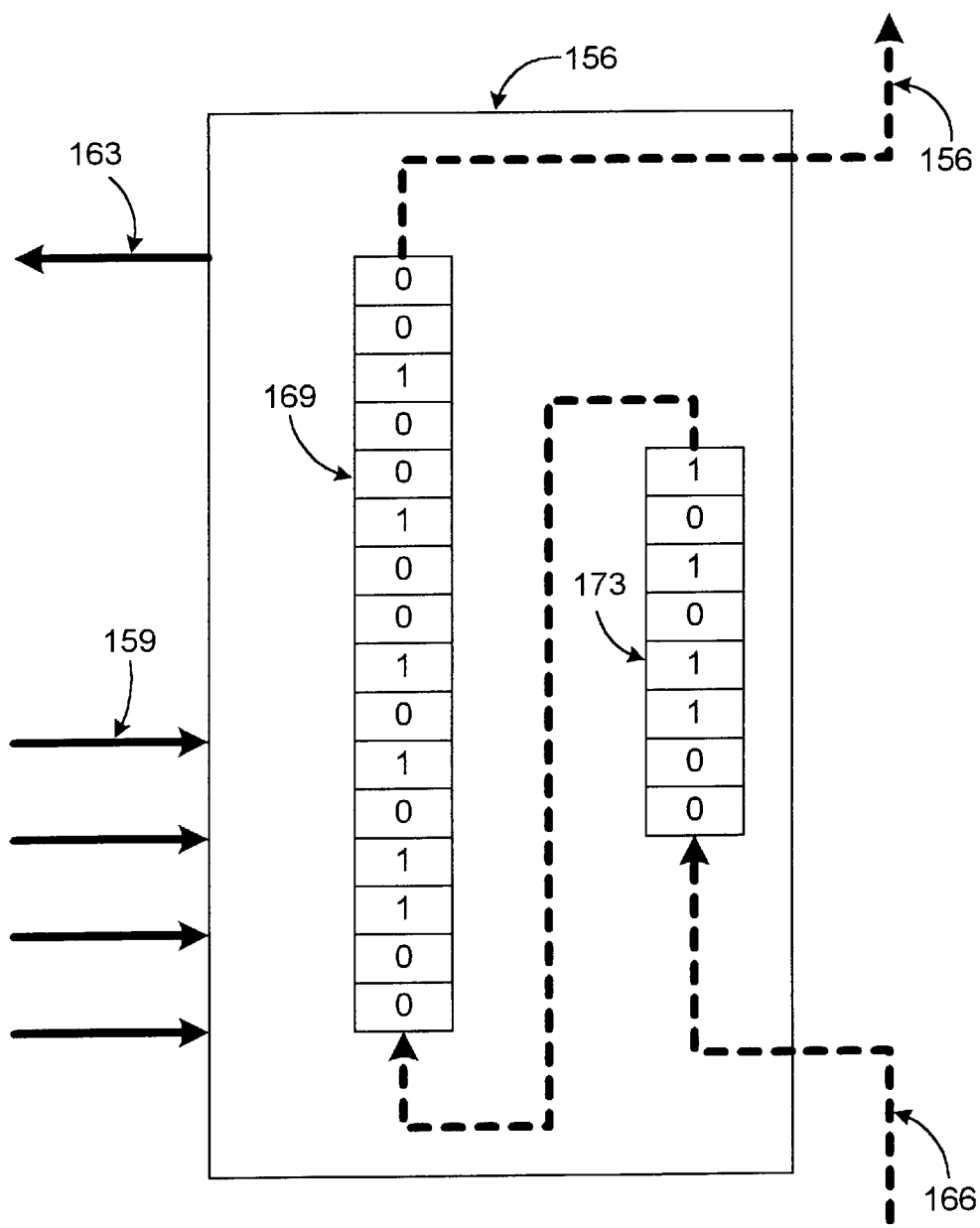
FIG. 3 is a block diagram of a lookup table employed in the field programmable gate array of FIG. 2.

Referring next to FIG. 3, shown is a lookup table 156 as employed in the present invention. The lookup table 156 includes the four inputs 159 and a single output 163. The four inputs 159 are generally selection inputs that point to one of sixteen values held in a 16×1 table 169. The value chosen is then applied to the output 163 in accordance with the operation of the lookup table 156. Although the lookup table is shown here as having four inputs that select one of sixteen outputs, it is understood that the lookup table may have more or less values in the table as well as more or less outputs. The lookup table 156 also includes one or more configuration registers 173 that hold values that control the operation of the lookup table 156 itself. This may include operation of an associated flip-flop, dedicated logic, and/or additional inputs not directly connected to the table 169, etc. Note that the table 169 and the configuration register 173 are part of the common configuration shift register 166 as shown. When the shift clock is activated for the FPGA 143 (FIG. 2), then values are shifted into the configuration register 173 and the table 169 accordingly. Note that the values in the 16×1 table 169 are not necessarily shifted consecutively, where any order of shifting among the various registers may be employed depend upon the physical layout of the lookup table 156 and of the FPGA 143 itself.

Figure 4:
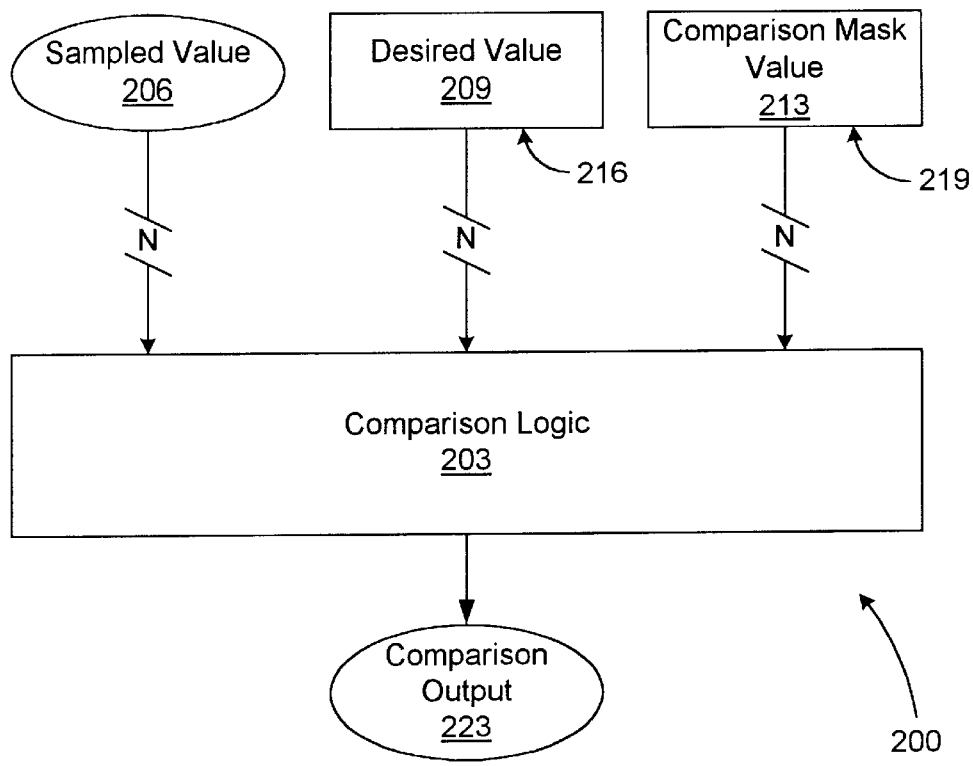
FIG. 4 is a block diagram of a prior art comparison configuration.

Turning next to FIG. 4, shown is a block diagram of a comparator 200 that is implemented using the various components of the FPGA 143. The comparator 200 comprises comparison logic 203 that receives a parallel sampled value 206 that is N bits wide from the front-end signal processing circuitry 129 (FIG. 1). In addition, the comparison logic 203 receives a desired value 209 and a comparison mask value 213 from a desired value register 216 and a comparison mask register 219, respectively. The desired value register 216 and the comparison mask register 219 are also both N bits wide and communicate the values in parallel to the comparison logic 203.

The sampled value 206 is a logical value received from the target system. The desired value 209 represents a value that one wishes to detect among the various logical values received from the target system. The comparison mask value 213 is a value that indicates which bits of the sampled value 206 are of interest and which bits are irrelevant for the particular comparison. In particular, the logic analyzer 100 may be employed to examine a particular bit or number of bits of a specific value from the target system. The sampled value 206, desired value 209, and the comparison mask value 213 are applied to the comparison logic 203, thereby resulting in a comparison output that generally indicates a match between the bits of interest in the sampled value 206 and the desired value 209.

Figure 5:
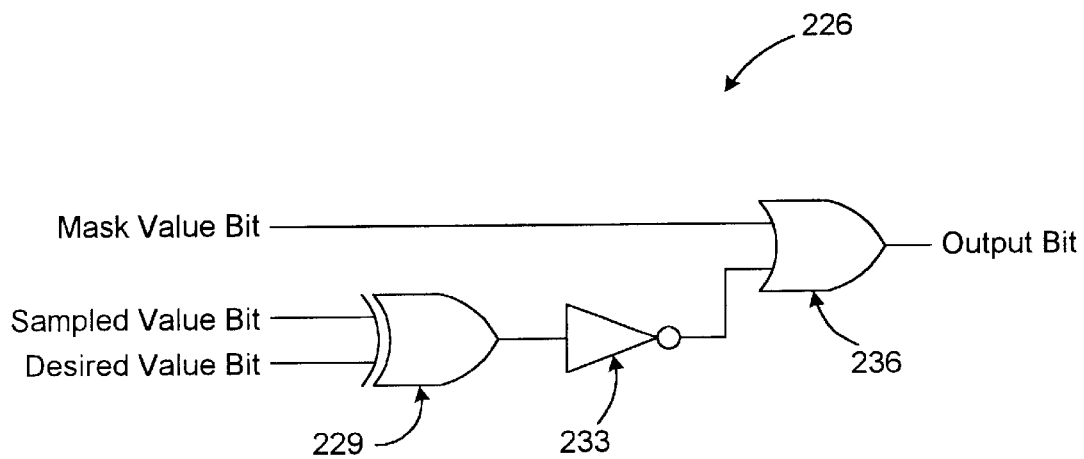
FIG. 5 is a schematic of a logical circuit of digital components that is implemented in the comparison configuration of FIG. 4.

With reference to FIG. 5, shown is a logical circuit 226 that performs a bitwise comparison in the comparison logic 203. The number of logical circuits 226 is equal to the number of bits N in the values 206, 209, and 219. The logical circuit 226 receives a bit from the sampled value 206, the desired value 209, and the comparison mask value 213. Each of these bits is on the same order in their respective values 206, 209, and 219. The sampled value bit and the desired value bit are applied to the inputs of an exclusive-or gate (X-or) 229, the output of which is applied to an inverter 233. The output of the inverter 233 and the mask value bit are applied to the inputs of an OR gate 236 that generates an appropriate output. The logical circuit thus determines whether the sampled value and desired value bits are the same, and also whether the particular bits are of interest according to the respective comparison mask bit. For those bits that are of interest, the comparison mask bit is a logical "0" (or "logical low") and for irrelevant bits, the comparison mask bit is a logical "1" (or "logical high"). This ensures that irrelevant bits do not generate a logical "0" at the output so that later circuitry is not affected by an irrelevant bit, assuming that an output bit equaling a logical "1" indicates a match. Thus, a logical "0" will only result if there is no match between the sampled value bit and the desired value bit and the bits themselves are of interest.

Each of the lookup tables 156 (FIG. 2) may be configured to perform the operation of the logical circuit 226. In addition, the lookup tables 156 may be configured to operate as a single bit register, where N lookup tables act as the desired value register 216 and N more lookup tables act as the comparison mask register 219. Note that these registers 216 and 219 may comprise logical components separate from the FPGA 143 (FIG. 2) as well, where the desired value 209 and the comparison mask value 213 are read into the FPGA 143 via the input/output circuits 146 (FIG. 2).

Thus, in order to compare a single sampled value with a single desired value and applying the comparison mask value thereto, then N lookup tables 156 would have to be used given that three inputs are needed. The outputs of each of the N lookup tables 156 would then be applied to further lookup tables 156 to determine if all bits match based on the respective output bits. It will be appreciated that this will use approximately 3N lookup tables 156 to perform a single comparison operation for logical values of N bits.

Figure 6:
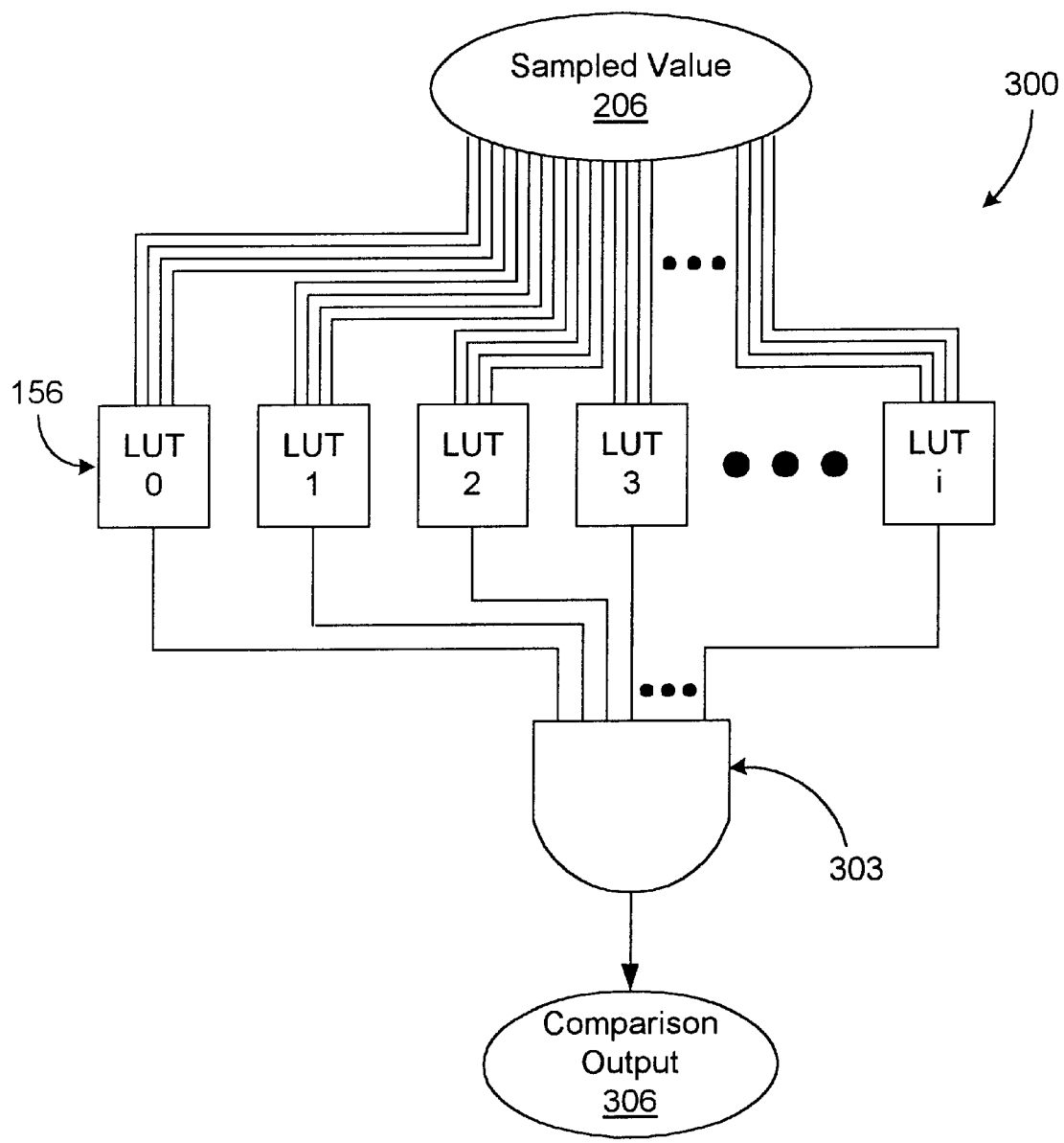
FIG. 6 is a block diagram of a comparison configuration according to an embodiment of the present invention.

With reference to FIG. 6, shown is a block diagram of a comparator 300 according to an embodiment of the present invention. The comparator 300 receives a sample value 206 that is N bits wide and applies M-bit portions of the sample value 206 to a number of lookup tables 156. In the comparator 300 of FIG. 6 for example, M=4 as the lookup tables 156 include four inputs, although lookup tables with a lesser or greater number of inputs may be employed. Also, in some cases the number of bits in the M-bit portions may be greater than N. Generally, the number M is equal to the number of inputs of the lookup tables 156, although it is possible that this may not be the case in all situations. The output from the lookup tables 156 are thereafter applied to a number of inputs of an AND gate 303 that generates a comparison output 306. Rather than using a single AND gate 303, a number of AND gates may be employed in a cascaded fashion as provided in conjunction with each lookup table 156 in many commercially available FPGAs 143 where the final AND gate in the cascaded group generates the comparison output 306. Alternatively, one or more lookup tables 156 may be employed as the AND gate 303. The configuration string that is downloaded into the lookup tables 156 and other components of the FPGA 143 (FIG. 2) generally configures the lookup tables 156 to operate in the manner shown. It is understood, that other functions may be performed by lookup tables 156 on the FPGA 143 not used by the comparator 300 as configured by the particular configuration string downloaded into the FPGA 143.

The comparator 300 provides distinct advantages in that the number of lookup tables 156 employed is significantly reduced over prior configurations. This frees up lookup tables in the FPGA 100 (FIG. 2) so that a given FPGA 100 may perform more comparisons per single FPGA 100. The comparison may be performed in NIM lookup tables 156 (using cascaded AND gates) compared to the approximate 3N lookup tables 156 required in the configuration of FIG. 4.

Figure 7:
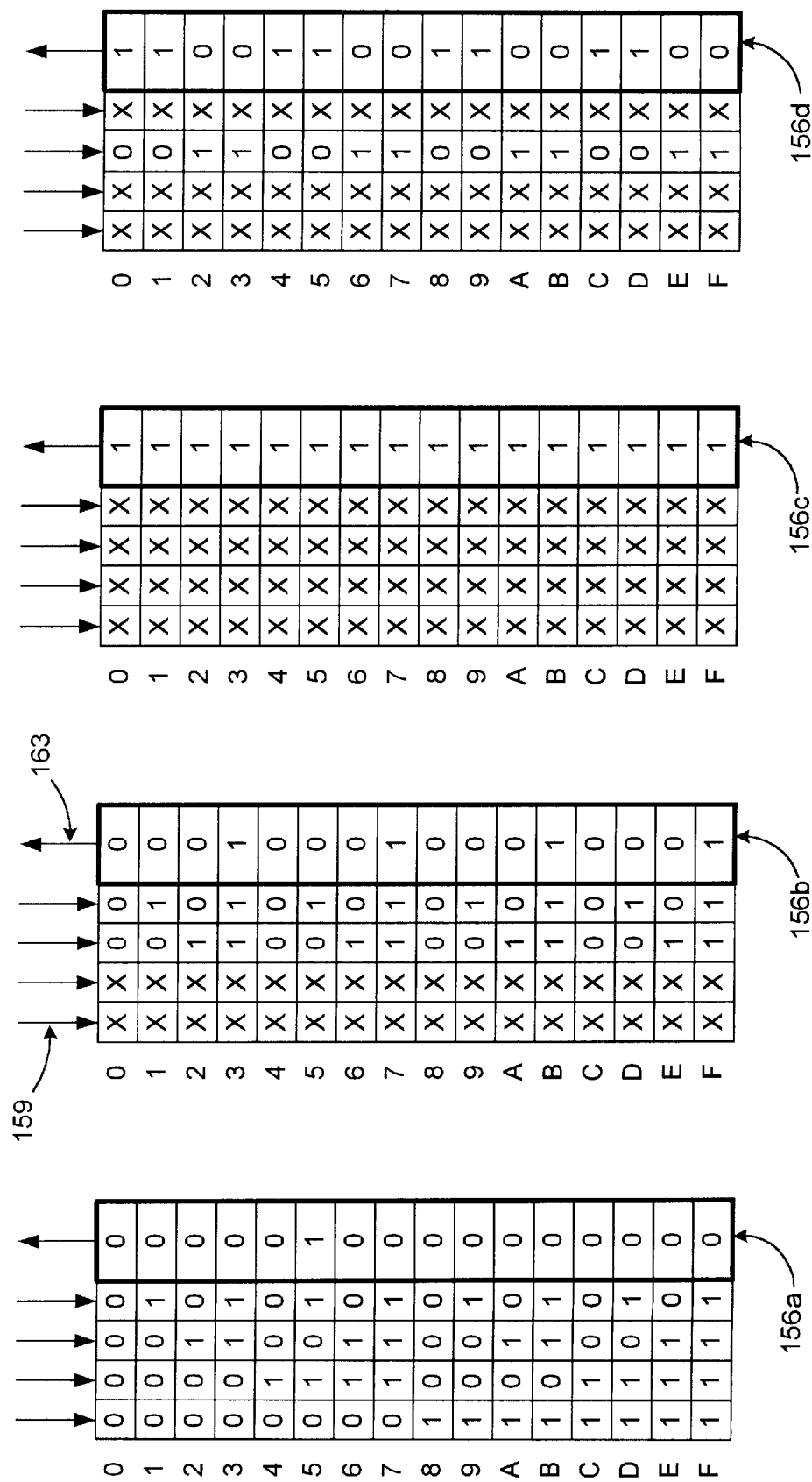
FIG. 7 illustrates charts of example lookup tables according to the comparison configuration of FIG. 6.

Turning to FIG. 7, shown are a number of lookup tables 156a–d according to the present invention. The lookup tables 156a–d show a few examples of the various comparison purposes for which a lookup table 156 can be used, although other comparisons may be performed that are not shown. Each of the lookup tables 156a–d includes the four inputs 159 and an output 163. The contents of the lookup tables 156a–d that are inserted into the configuration string are in the right most column with the heavy border, whereas the 4 left columns to the left of the lookup tables 156a–d indicate the values of the inputs 163. By way of an example, the lookup table 156a provides a logical "1" at the output 163 when the input is equal to HEX value 5. Lookup table 156b provides a comparison that generates a logical "1" at the output 163 when the two least significant bits are equal to a logical "1". Note that the two most significant bits of the lookup table 156b are masked out with the comparison mask value and are irrelevant to the output 163.

The lookup table 156c shows the situation where the output 163 is always positive no matter what the values of the inputs 159. Finally, the lookup table 156d shows a circumstance where a logical "1" is seen at the output 163 when the second least significant bit is equal to a logical "0", where all other inputs 159 are masked out by the comparison mask value. Obviously, in light of the foregoing, it is understood that the lookup tables 156 may be configured for any one of a number of direct comparisons.

Figure 8:
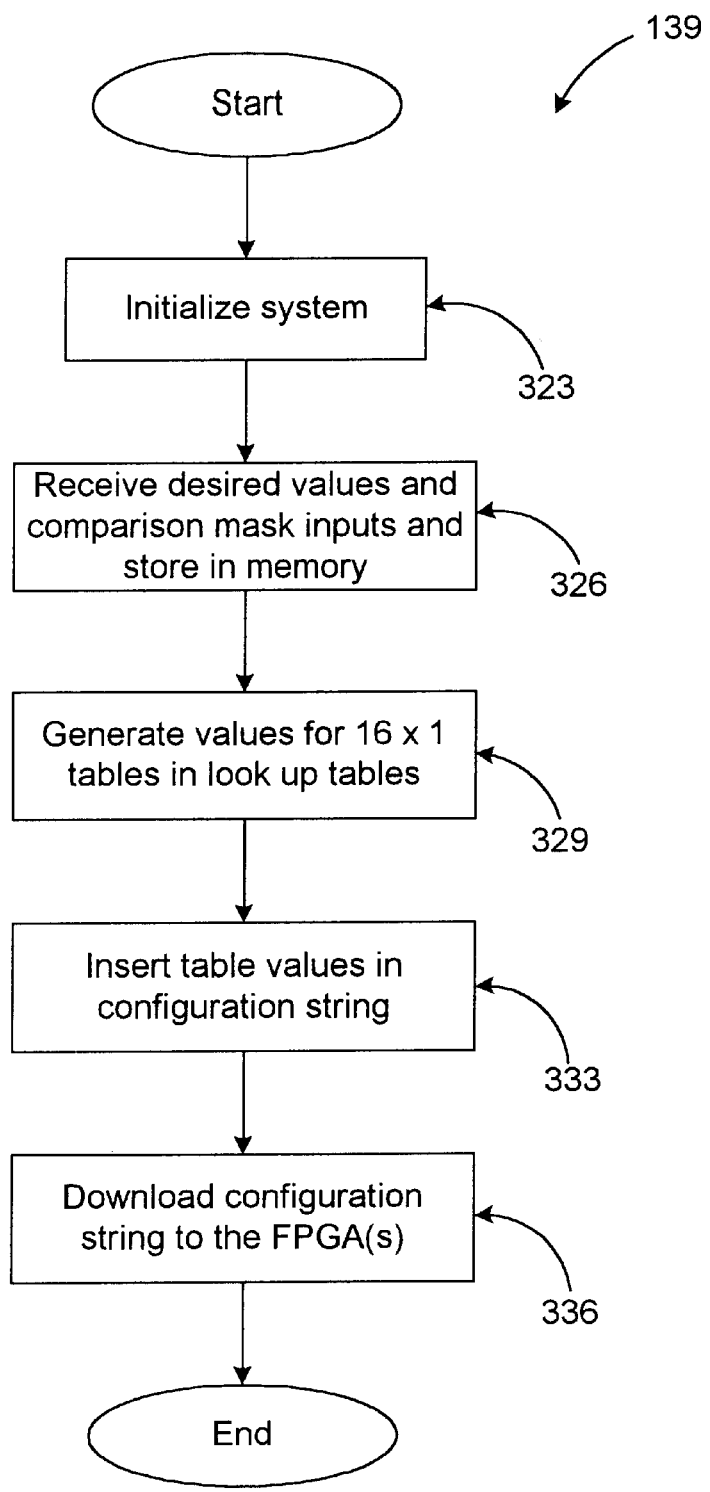
FIG. 8 is a flow chart of setup logic executed in the logic analyzer of FIG. I. configuration of FIG. 4.

With reference then, to FIG. 8, shown is the setup logic 139 that is executed by the processor 103 (FIG. 1). Beginning at block 323, the system is initialized for operation. Thereafter, in block 326 the desired values 216 and the comparison mask values 213 are received via the user input interface 116 and stored in the memory 106. Next, in block 329, the values to be placed in the 16×1 tables 169 (FIG. 3) are generated from the desired values 209 and the corresponding comparison mask values 213. In block 333 the values to be placed in the 16×1 tables 169 are inserted into the configuration string to be downloaded to the FPGA 143 (FIG. 2). This may be accomplished by tools specific to the FPGA 143 or by algorithms relative to the structure of the configuration string that is used with a specific FPGA 143. Finally, in block 336, the configuration string is downloaded into the FPGA 143 and the logic analyzer 100 (FIG. 1) is ready for data acquisition from the target system.

In addition, the setup logic 139 of the present invention can be implemented in hardware, software, firmware, or a combination thereof. In the preferred embodiment(s), the setup logic 139 is implemented in software or firmware that is stored in a memory and that is executed by a suitable instruction execution system. If implemented in hardware, as in an alternative embodiment, the setup logic 139 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow chart of FIG. 8 shows the architecture, functionality, and operation of a possible implementation of the setup logic 139 of FIG. 8. In this regard, each block represents a module, segment, or portion of code, which comprises one or more executable instructions for implementing the specified logical function(s). It should also be noted that in some alternative implementations, the functions noted in the blocks may occur out of the order noted in FIG. 8. For example, two blocks shown in succession in FIG. 8 may in fact be executed substantially concurrently or the blocks may sometimes be executed in the reverse order, depending upon the functionality involved.

Finally, the setup logic 139, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computerreadable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A field programmable gate array configured for comparing logical values, comprising:
    a number of inputs to receive an N-bit sampled value, where N defines the number of bits in the N-bit logical value;
    a number of lookup tables configured to receive an M-bit portion of the N-bit sampled value, each of the lookup tables generating a lookup table output in response to the M-bit portion; and
    logic to perform a logical AND operation upon the lookup table outputs.

2. The field programmable gate array of claim 1, the logic to perform a logical AND operation further comprises a series of cascaded AND gates.

3. The field programmable gate array of claim 1, wherein the number of lookup tables is the smallest integer at least as great as N/M.

4. A field programmable gate array configured for comparing logical values, comprising:
    means for receiving an N-bit sampled value, where N defines the number of bits in the N-bit sampled value;
    means for matching an M-bit portion of the N-bit sampled value with one of a number of M-bit portion variations, wherein a matching output is generated depending upon the M-bit portion variation that matches the M-bit portion; and
    means for performing an AND operation on all of the matching outputs.

5. A system for comparing logical values, comprising:
    a system to generate a configuration string that is applied to a field programmable gate array, the field programmable gate array comprising:
        a number of inputs;
        a number of lookup tables, each of the lookup tables being configurable to receive data from the inputs, each of the lookup tables generating a lookup table output therefrom;
        an AND gate having a number of inputs that are configurable to receive the lookup table outputs; and
    wherein the configuration string configures the field programmable gate array to receive an N-bit sampled value at the number of inputs, where N defines the number of bits in the N-bit sampled value, and, the configuration string configures each of the lookup tables to receive an M-bit portion of the N-bit sampled value, the lookup tables generating a lookup table output in response to the M-bit portion that is applied to the inputs of the AND gate.

6. The system of claim 5, wherein the number of lookup tables is the smallest integer at least as great as N/M.

7. The system of claim 5, wherein the system to generate a configuration string further comprises:
    a processor electrically coupled to a local interface;
    a memory electrically coupled to the local interface;
    operating logic stored on the memory and executed by the processor, the operating logic including:
        logic to receive at least one desired logical value via a user interface;
        logic to insert the desired logical value into the configuration string; and logic to apply the configuration string to the field programmable gate array.

8. A system for comparing logical values, comprising:

means for generating a configuration string that is applied to a field programmable gate array, the field programmable gate array comprising:
- a number of inputs;
- a number of lookup tables, each of the lookup tables being configurable to receive data from the inputs, and each the lookup tables generating a lookup table output therefrom;
- an AND gate having a number of inputs that are configurable to receive the lookup table outputs; and wherein the configuration string configures the field programmable gate array to receive an N-bit sampled value at the number of inputs, where N defines the number of bits in the N-bit sampled value, and, the configuration string configures each of the lookup tables to receive an M-bit portion of the N-bit sampled value, the lookup tables generating a lookup table output in response to the M-bit portion that is applied to the inputs of the AND gate.

9. The field programmable gate array of claim 8, wherein the number of lookup tables is the smallest integer at least as great as N/M.

10. The field programmable gate array of claim 8, wherein the means for generating the configuration string further comprises:

means for receiving at least one desired logical value;

means for inserting the desired logical value into the configuration string; and means for applying the configuration string to the field programmable gate array.

11. A method for comparing logical values in a field programmable gate array, comprising the steps of:

receiving an N-bit sampled value, where N defines the number of bits in the N-bit sampled value;

matching a number of M-bit portions of the N-bit sampled value with one of a number of M-bit portion variations, wherein a matching output is generated depending upon the M-bit portion variation that matches the M-bit portion; and performing an AND operation on all of the matching outputs.

\* \* \* \* \*